Patented Mar. 18, 1930

1,750,751

UNITED STATES PATENT OFFICE

ANDRÉ GEYER, OF PARIS, FRANCE

ALUMINUM ALLOY

No Drawing. Application filed June 25, 1927, Serial No. 201,564, and in France February 4, 1927.

It is well known that in order to obtain unusually light aluminum alloys having remarkable resisting properties it has been proposed to incorporate carbon in the bath of molten metal, a portion of the carbon combining with the constituents of the alloy. The incorporation of carbon in the alloy and more especially with the aluminum forming the principal element of the latter gives to the metal which is produced very good qualities of resistance to rupture, of elasticity and of elongation, and at the same time a low density.

Now these manufacturing processes are not wholly satisfactory owing to the fact that in order to produce a homogeneous metal and to avoid combustion of some of its constituents, they require that the bath be perfectly protected in order to prevent surface or local oxidation.

My invention has for its object to obviate these drawbacks and to render the method of manufacturing technically and practically applicable. It consists essentially in effecting the treatment of the alloy in a reducing atmosphere in order to avoid alteration of the aluminum caused by the oxidation or even the dissolution of the gases. It may consist also in adding to the bath of molten metal, constituents such as silicon and iron which improve the qualities and particularly the elasticity of the metal. It has further for its object various operative methods which will be fully indicated in the following description.

The reducing atmosphere may be created to insure the protection of the bath of molten metal during the whole operation by means of a layer of broken up charcoal or other forms of carbon floating on the surface together with the addition of powdered charcoal or other forms of carbon in the bath and by combining both means of external and internal protection by carbon with the action upon or in the bath of solid liquid or gaseous bodies capable of ensuring the reducing atmosphere required by the quality and the regularity of the operation or of any substances contributing to the production of said atmosphere.

There may be added to the bath powdered charcoal moistened with water, the hydrogen of which when set free adds its reducing effect to that of the charcoal.

There may also be added on the surface of the molten bath, during the whole operation, a layer of material or a mixture of liquid or solid non-miscible substances capable of constituting a protective layer without dissolving in the constituents of the alloy. Among these latter substances there may be mentioned the carbides and certain stable reducing salts of various metals, which are not apt to be displaced by aluminum in their combinations, also various refractory clays of appropriate constitution, etc.

In order to insure the incorporation of carbon in the alloy there may be added to the bath in the place of powdered or broken-up charcoal, or together with the latter any desired metal carbide such as iron, copper, chromium, nickel, uranium carbides or any alloy containing carbon in combination or solution such as carbon-chromium, carbon-manganese, etc.

In fact, it appears advantageous at the present time to produce a high and controllable percentage of chemically combined carbon. Now the addition of a metal carbide, the aluminum having or not a tendency to displace the basic metal, appears to be the best means of producing a high percentage of combined carbon in the alloy. Even in the case of the aluminum having no tendency to substitute itself to the basic metal of the carbide, the presence of carbon chemically combined with one of the constituents is of great value.

A partial vacuum or an atmosphere of reducing or inert gases such as hydrogen, carbon monoxide or any other gas or gaseous mixture capable of fulfilling the required conditions, such as lighting or coal gas, water gas, the products of combustion of the fuel used for heating the crucible, etc., may be maintained in the crucible above the surface of the bath of molten metal.

Lastly, a current of reducing gas under pressure may also be forced into the bath through the molten metal during the whole of the operation said current of gas ensuring at the same time the stirring of the bath.

This operation could be effected in a crucible having immersed therein a tube in which the reducing gas would be forced and would rise again in the shape of bubbles through the metal.

It could also take place in a kind of swinging converter similar to a Bessemer converter in which the gas would be driven through the metal in the same manner as air is driven through the molten metal in the manufacture of Bessemer steels.

In both the above cases there may be added to the reducing gas a certain quantity of superheated steam and the gaseous current may be charged with carbon by means of pulverized charcoal, graphite, coke or the like. The decomposition of the steam by the carbon owing to the heat of the bath would then set free a certain quantity of hydrogen in statu nascendi, the high reducing power of the latter being added to that of the coal and of the gas.

It will be evident that these various means designed to create a reducing atmosphere in or upon the bath may be used separately or suitably combined.

As regards the constitution of the alloy and in order to give it higher qualities of elasticity there may be added preferably silicon for example in the shape of cupro-silicon or of another combination of said substance, the free silicon being absorbed by subsequently adding pure iron.

The aluminum alloys produced by means of my improved process are usually constituted by divers combinations of aluminum, copper, manganese, silicon, magnesium, iron and carbon. They may also comprise various other constituents such as: tungsten, nickel, molybdenum, chromium, and cadmium, which may be added in varying quantities according to the desired results.

The following typical composition of a highly resisting alloy obtained by the above process is given as a particular example of an alloy according to the present invention:

| | |
|---|---|
| Aluminum | 93,84 |
| Copper | 3,55 |
| Magnesium | 0,70 |
| Manganese | 0,66 |
| Silicon | 0,60 |
| Iron | 0,54 |
| Carbon and other substances | 0,11 |
| | 100,00 |

Once rolled and annealed, for instance in the shape of plates of 40 to 3 mm. in thickness, the metal obtained has approximately the following characteristic coefficients:

| | |
|---|---|
| Resistance to fracture | 46,5 |
| Apparent limit of elasticity | 31,2 |
| Density | 2,7 to 2,8 |
| Elongation | 22 |

The particular process of manufacture of this alloy will now be described also by way of example:

The greater part of the aluminum (about ⅔ or ¾) is melted and broken charcoal as well as a portion of the powdered charcoal is introduced into the bath which is then heated, when the latter has reached a temperature substantially equal or higher (800 to 1,100°) than the melting point of aluminum, cupro-manganese, pure copper and cupro-silicon are added. The mixture is stirred and powdered charcoal moistened with water is added; the bath is stirred again and the heating is continued until the temperature of 1100° to 1200° has been reached and before the higher temperature has been reached there is added pure iron and powdered charcoal moistened with water, the mixture is again stirred and heating is continued until the high temperature indicated has been reached. The remaining portion of the aluminum is then added, the bath is skimmed and the alloy produced is cast in ingots or pigs with the usual precautions for casting aluminum. The metal is finally rolled and annealed.

During the whole melting process the reducing atmosphere has been produced by the combined action of carbon and of the hydrogen of the water used for moistening the powdered charcoal and to this double action may be advantageously added that of a reducing gas or of a solid or liquid reducing body in the above described conditions.

The alloy so manufactured lends itself to direct machining by rolling, drawing, etc. the metal having acquired its characteristic properties which vary according to the rate of cooling.

The quantity of aluminum introduced at the beginning of the operation may of course be reduced in order to obtain a rich metal which may be subsequently added to the pure aluminum or to a metal alloy by melting.

My improved process may be applied to the direct manufacture of aluminum by adding in the crucible during electrolysis the carbon required and by creating as above mentioned the reducing atmosphere for the bath, thus allowing the direct production of aluminum containing incorporated carbon. Other metal constituents may also be added in the crucible in order to produce immediately at the first melting the aluminum alloys containing carbon.

What I claim and desire to secure by Letters Patent of the United States is:—

1. A process for the manufacture of aluminum alloys containing carbon which consists in introducing powdered charcoal and water into the molten bath, protecting the surface of the said molten metal bath with broken up charcoal and operating at a temperature above 900° C.

2. A process for the manufacture of aluminum alloys containing carbon which consists in introducing powdered charcoal wetted with water into the molten bath, protecting the surface of the said molten bath with broken up charcoal and operating at a temperature above 900° C.

In witness whereof, I have hereunto signed my name.

ANDRÉ GEYER.